United States Patent [19]

Abdelrazig et al.

[11] Patent Number: 5,326,397
[45] Date of Patent: Jul. 5, 1994

[54] LOW SHRINKAGE CEMENT COMPOSITION

[75] Inventors: Baha E. I. Abdelrazig, Columbia; Ellis M. Gartner, Silver Spring; David F. Myers, Columbia, all of Md.

[73] Assignee: W. R. Grace & Co.-Conn., New York, N.Y.

[21] Appl. No.: 99,089

[22] Filed: Jul. 29, 1993

[51] Int. Cl.$^5$ .............................................. C04B 24/12
[52] U.S. Cl. .................. 106/808; 106/727; 106/819; 106/823
[58] Field of Search ............... 106/808, 819, 823, 727; 562/555

[56] References Cited

U.S. PATENT DOCUMENTS

| | | | |
|---|---|---|---|
| 3,459,570 | 8/1969 | Serafin | 106/727 |
| 3,574,711 | 4/1971 | Robeton | 560/157 |
| 4,116,706 | 9/1978 | Previte | 106/823 |

FOREIGN PATENT DOCUMENTS

| | | | |
|---|---|---|---|
| 551298 | 4/1977 | U.S.S.R. | |
| 629193 | 9/1978 | U.S.S.R. | |
| 2030986 | 4/1980 | United Kingdom | 106/808 |
| 2056963 | 3/1981 | United Kingdom | 106/808 |

OTHER PUBLICATIONS

Chemical Abstract #CA98(5):33373a "Relative toxicity and persistence . . . control of grain insects" (1982) (abstract only).

*Primary Examiner*—Anthony Green
*Attorney, Agent, or Firm*—Howard J. Troffkin

[57] ABSTRACT

A cement composition capable of inhibiting drying shrinkage and cracking resulting therefrom composed of cement and an alkyl or cycloalkyl carbamate, an alkylene dicarbamate, polyoxyalkylene dicarbamate or mixtures thereof.

16 Claims, No Drawings

LOW SHRINKAGE CEMENT COMPOSITION

BACKGROUND OF THE INVENTION

The present invention is directed to a cement composition admixture capable of reducing drying shrinkage and cracking resulting therefrom.

One of the major disadvantages of conventional cement compositions is that they tend to shrink during curing of the composition. This shrinkage results in cracks, and other defects in the resultant structure. Such cracks have both appearance and physical defects to the structure. For example, water can enter in the cracks and further deteriorate the structure through freeze-thaw pressures exerted by the water on the cement composition.

Various admixtures have been suggested as useful in reducing drying shrinkage and the resultant cracking. Japanese Patent Laid-Open Application 81/37259 and Japanese 87/10947 disclose the use of alcohol-alkylene oxide and alkylphenol-alkylene oxide adducts as useful for this purpose. However, these materials must be used in large dosages which causes their usage to be too expensive for practical use. $C_4$-$C_6$ alkyl alcohols, as disclosed in U.S. Pat. No.5,181,961, have been suggested for use in inhibiting drying shrinkage. However, the alcohols are not highly effective under dry conditions and they tend to leach out under any wet condition encountered. In addition the lower alcohols have high vapor pressure at ambient conditions and are, therefore, difficult to handle.

A need continues to exist for a cement composition admixture and a resultant cement composition capable of inhibiting drying shrinkage. The admixture must be inexpensive, readily handleable at the job site and provide the desired inhibiting effect at low dosage levels.

SUMMARY OF THE INVENTION

The present invention provides a cement composition, capable of inhibiting drying shrinkage to cement compositions. The admixture provides the desired result under various environment conditions, can be used in low dosages and is readily handled at the job site. The subject admixture comprises at least one compound of the formula

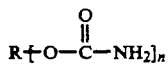

where R represents a $C_3$-$C_8$ alkyl group or a $C_5$-$C_6$ cycloalkyl group when n is 1 or a $C_2$-$C_{10}$ alkylene group or a group having the formula $A(OA)_xOA$ wherein each A is a $C_2$-$C_3$ alkylene and x is an integer of from 0 to 10 when n=2.

DETAILED DESCRIPTION OF THE INVENTION

It has been presently found that carbamates, as fully described herein below, are compounds capable of inhibiting drying shrinkage and the resulting stress cracks normally encountered in cement compositions.

Cement compositions undergo a sequence of stages during its complete curing process. From the initial hydration of the cement until set, the mass undergoes certain dimensional changes, including plastic shrinkage. The mass can, however, substantially overcome and correct for the stresses which occur at this stage. However, subsequent to set, the mass undergoes further dimensional changes which are called dry changes, including drying shrinkage. Although these changes are small in magnitude, they give rise to internal and external stresses which result in the formation of permanent cracks and deformations to the mass.

The admixture unexpectedly found to inhibit dry shrinkage is composed of at least one compound represented by the formula:

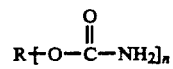

wherein R is a $C_3$-$C_8$ alkyl group, or $C_5$-$C_6$ cycloalkyl group when n is 1 or a $C_2$-$C_{10}$ alkylene or an oxyalkylene $A(OA)$ OA group with x being 0 to 10, when n is 2.

In the above formula, typical examples of the alkyl group represented by R include n-propyl, isopropyl, n-butyl, iso-butyl, tertbutyl, n-pentyl, iso-pentyl, 1,2 dimethyl butyl, 1,3-dimethyl butyl, 2,2-dimethyl propyl, tert-pentyl, n-hexyl, iso-hexyl, 2-methyl pentyl, 3-methyl pentyl, 4-methyl pentyl, 2,2-dimethyl butyl, 3,3-dimethyl butyl and 2,3-dimethyl butyl; and typical examples of the cycloalkyl group represented by R include cyclopentyl, cyclohexyl and methyl cyclohexyl. Among these groups, the most preferred group is a butyl group.

Examples of the divalent R groups are alkylene groups, such as ethylene, propylene, 1-methyl-ethylene, hexylene and the like; and alkylenoxyalkylene (AOA) or polyoxyalkylene $—A(OA)_xOA—$ groups such as $—CH_2CH_2OCH_2CH_2—$; $—CH_2CH_2CH_2 O CH_2CH_2CH_2—$; or $—CH_2CH_2(OCH_2CH_2)_xOCH_2CH_2—$ and the like. Among these groups, the most preferred are ethylene, propylene, and ethyleneoxyethylene.

The present cement composition admixture are solids or liquids which can be readily transported and either dispersed in water or water-alcohol media or made solutions therewith. Thus, the subject admixtures can be introduced into and made part of a dry mix of cement and the subject admixture. Such mixtures can be formed with from about 90 to 99 weight percent cement and 1 to 10 (preferably 1 to 5) weight percent of the present admixture. Alternately, the present admixture can be added (either in its solid state or as a dispersion) as part of the mixing of components used in forming the cement composition. For example, a preferred alkyl carbamate, n-butylcarbamate, is a solid. It can be readily mixed with conventional portland cement to form a dry powder blend which when later hydrated in forming the desired cement composition, provides a composition which exhibits the desired inhibiting properties with respect to drying shrinkage. Alternatively, the n-butylcarbamate can be formed into an aqueous-alcoholic solution to be used as an admixture to be introduced into the cement composition at the job site or at the ready-mix batching plant.

The presently described admixture can be used to inhibit drying shrinkage in a variety of cement compositions, such as pastes (cement and water), mortars (cement, sand or other small particulate matter and water) and concretes (cement, sand, gravel and water). Suitable cement include ordinary portland cement (e.g. ASTM type I), special portland cement (high early strength portland cement and moderate heat portland cement), portland blast furnace slag cement, portland fly ash cement, as well as blended and high aluminous cement, for example.

In the preparation of a cement composition of the invention, aggregates such as gravel, sand, pumice and burned perlite may be used in known manners according to the specific application. Further, conventional water-reducing agents, air-entraining agents, expansive agents, shrinkage-reducing agents other than the present invention, and other known admixtures for mortar or concrete may be jointly used.

Examples of known additives for mortar and concrete include hardening accelerators, such as metal chlorides (e.g. calcium chloride) or organic amines (e.g. triethanolamine), hardening retarders such as saccharides, starches, hydroxy carboxylic acids and glycerol; and corrosion inhibitors for reinforcing steel, such as sodium nitrite and calcium nitrite. The amount of such an optional additive added to cement is usually 0.1–5 weight percent.

The amount of water to be added according to the invention is not critical as long as it is sufficient to effect hydration. The water/cement ratio is usually about 0.3 to 0.6, and preferably from 0.35 to 0.5.

It has been found that the present admixture provides a further enhanced cement composition when used in combination with a water-reducing agent. Although the carbamate described above can be used alone and provides both drying shrinkage inhibition and permits reduction in water, the composition when having both the subject carbamates and water-reducing agent provides enhanced properties. Examples of suitable, water-reducing agents are naphthalene sulfonate formaldehyde condensates, lignin sulfonates, melamine sulfonate formaldehydes, polyacrylates and the like. The amount of such water reducing agent to be used can range in from 0.05 to 5 weight percent based on the cement content of the formed composition.

The water-reducing agent can be added to the cement composition in ordinary manners, as part of any other admixture or with the present drying shrinkage control agent when added to the mixture of cement, aggregate and water.

The drying shrinkage inhibiting agent of the present invention can be added either to a dry cement or to a mixture of cement and other appropriate components forming the desired cement composition. Because the present admixture is either a solid or a low vapor pressure, high boiling liquid, it can be readily handled and stored without concern of evaporation and lack of potency at time of use. Thus, the present carbamate shrinkage reducing agent can be either dry mixed with the cement powder, or spray applied to the cement powder with further mixing. When the cement composition is a cement paste, the cement composition can be prepared by using a pre-mixed cement agent which is mixed with water, or a prescribed amount of the shrinkage-reducing agent is first dissolved in water-alcohol solution and then the solution is mixed with cement. If the cement composition is a mortar or concrete, a composition of the shrinkage reducing agent in an aqueous emulsion or dispersion may be first prepared and then mixed with cement and aggregate, or a given amount of the shrinkage-reducing agent is added to a mixture of cement, water, and aggregate while they are being stirred.

The cement composition may be cured using any of the atmospheric, wet air, water, and or heat-accelerated (steam, autoclave, etc.) curing techniques. If desired, two or more such techniques may be combined. The respective curing conditions may be the same as in conventional ones.

The present carbamate agents can be formed in known manners. For example, the agents can be formed from the related alcohol and urea at elevated temperatures in the presence of a catalyst such as heavy metal salts of weak organic acids or zinc or cobalt halide (chlorides). Alternately, the carbamate (especially tertiary carbamates) are formed with an alkali metal cyanate in the presence of trifluoroacetic acid, as taught in Organic Synthesis, Collective Volume 5, Page 162.

The present carbamates are formed in known manners. They can be formed from commodity chemicals by simple processing techniques. Further, the present shrinkage and crack control agents of the present invention are effective in low dosages of from about 1 to 10 weight percent based on the cement component of the cement composition. It is preferred to use from 1 to 5 and most preferrably to use from 1 to 4 weight percent of the present agent based on cement content. The low dosage and ease of formation of the present agent provides a cost effective dry shrinkage and crack control agent for cement compositions. When the subject carbamate and water reducing agent are used in combination, the weight ratio of these components are 100:1 to 1:5 and preferably from 10:1 to 1:2.

The following example is given for illustrative purposes only and are not meant to be a limitation on the claims appended hereto. All parts and percentages are by weight unless otherwise indicated.

EXAMPLE

A micro-concrete composition composed of a mortar specifically designed to simulate concrete was formed using portland cement, and fine aggregate of varying particle size. The composition was formed of the following mix:

| Components | Part by Weight |
| --- | --- |
| Cement | 100 |
| Sand A | 60 |
| Sand B | 54 |
| Sand C | 54 |
| Sand D | 102 |

Sand A had the following particle size distribution: 0.000% retained on 600 micron sieve size openings (reported as "0.00%/600"), 0.4%/425, 2%/300, 8%/212, 33%/150, 39%/106, 15%/75 and 2.6%/53.

Size B had a particle size of 150 to 1180 micron in accordance with ASTM C-778.

Sand C had a particle size of 600 to 1180 micron in accordance with ASTM C-778.

Sand D had the following particle size distribution: 0.00%/5000, 12.7%/2360, 55.7%/1700, 25.5%/1180, 5.4%/850 and 0.7%/600.

The various sand components were mixed together using a low speed mixer. The cement was then added with further mixing to form a substantially uniform blend. To this blend was added an aqueous dispersion of 3.16 parts n-butyl carbamate in 4.17 parts ethanol/37.83 parts water to provide a liquid/cement ratio of 0.42 and water to cement ratio of 0.39. Mixing was continued at low speed for 8 minutes and then poured into eight molds having dimensions of 25×25×285 mm. The specimens were cured for 24 hours in a chamber maintained at 100% relative humidity, demolded and then four (4) of the formed bars were cured for 6 additional days at 100% relative humidity and 23° C. and before being transferred to the environment chamber maintained at 50% relative humidity ("moist cure"). The remaining four (4) of the formed bars were cured at 50% relative humidity at 23° C. ("dry cure") in order to measure drying shrinkage at differing conditions. Each of the bars was measured at regular intervals for changes in linear length using the comparator, described in ASTM C-490.

The results are given in Tables I and II below for dry cure and moist cure conditions, with respect to change in length (measured length minus original length divided by original length) with respect to time. Thus, a negative value connotes shrinkage in the length of the sample.

For comparative purposes, samples were formed in the same manner as described above except that the carbamate agent was omitted in one set of specimens ("Comp. I") and the carbamate and ethanol (equal amount replaced by H₂O) were deleted in a second set of specimens ("Comp. II). The samples were tested in the same manner as described above and the results are given in Table I (for dry cure conditions) and Table II (for moist cure conditions).

TABLE I

| Unrestrained Drying Shrinkage (Dry Cure) | | | |
|---|---|---|---|
| | Length Change ($\times 10^{-6}$) | | |
| Example | 1 week | 2 weeks | 4 weeks |
| Carbamate | −266 | −326 | −349 |
| COMP. I | −514 | −596 | −969 |
| COMP. II | −459 | −563 | −591 |

TABLE II

| Unrestrained Drying Shrinkage (Moist Cure) | | | |
|---|---|---|---|
| | Length Change ($\times 10^{-6}$) | | |
| Example | 1 week | 2 weeks | 4 weeks |
| Carbamate | +33 | −186 | −240 |
| COMP. I | +36 | −338 | −896 |
| COMP. II | +33 | −444 | −667 |

The above data shows that samples which contained carbamate shrinkage reducing agent of the present invention exhibited substantially less drying shrinkage in comparison to samples without the subject carbamate (those merely with water or water/ethanol carrier mixture). Specifically, the dry cure samples with butyl carbamate exhibited 45% less drying shrinkage under dry cure conditions and about 60% less under moist cure conditions with respect to the sample prepared with water only.

What is claimed is:

1. A cement admixture comprising at least one compound of the formula:

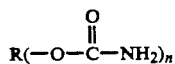

wherein n is 1 or 2 and when n is 1, R is a $C_3$–$C_8$ alkyl group or a $C_5$–$C_6$ cycloalkyl group and when n is 2, R is a $C_2$–$C_{10}$ alkylene or an $A(OA)_xOA$ group in which A is a $C_2$–$C_3$ alkylene and x is an integer of from 0 to 10; and at least one cement water reducing agent; wherein the weight ratio of said at least one compound to said water reducing agent is from 0.2 to 200.

2. The admixture of claim 1 wherein R is a $C_4$–$C_6$ alkyl and n is 1.

3. The admixture of claim 1 wherein R is a butyl group and n is 1.

4. The admixture of claim 1 wherein R is a $C_4$–$C_8$ alkylene and n is 2.

5. An improved cement powder composition comprising from 99 to 90 weight percent of a cement powder selected from a portland cement, blended cement or aluminous cement and substantially uniformly dispersed therein from 1 to 10 weight percent of at least one compound of the formula

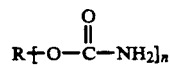

wherein n is 1 or 2 and when n is 1, R is a $C_3$–$C_8$ alkyl group or a $C_5$–$C_6$ cycloalkyl group and when n is 2, R is a $C_2$–$C_{10}$ alkylene or an $A(OA)_xOA$ group in which A is a $C_2$–$C_3$ alkylene and x is an integer of from 0 to 10.

6. The composition of claim 5 wherein R is a butyl group and n is 1.

7. The composition of claim 5 wherein R is $A(OA)_xOA$ in which each A represents an ethylene group, x is 0 or 1 and n is 2.

8. The composition of claim 5 which further contains from 0.1 to 5 wt. percent of at least one trialkanolamine.

9. The admixture of claim 1 wherein R is a $C_4$–$C_8$ alkylene and n is 2.

10. An improved concrete composition comprising cement, sand, aggregate and water and having substantially uniformly dispersed therein from 1 to 10 weight percent based on the cement of at least one compound of the formula:

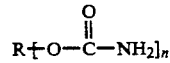

wherein n is 1 or 2 and when n is 1, R is a $C_3$–$C_8$ alkyl group or a $C_5$–$C_6$ cycloalkyl group and when n is 2, R is a $C_2$–$C_{10}$ alkylene or an $A(OA)_xOA$ group in which A is a $C_2$–$C_3$ alkylene and x is an integer of from 0 to 10.

11. The composition of claim 10 which further contains from 0.05 to 5 weight percent based on the weight of the cement in said composition of a cement water reducing agent.

12. The composition of claim 10 wherein R is a butyl group and n is 1.

13. The composition of claim 11 wherein R is a butyl group and n is 1.

14. The composition of claim 10 wherein R is $A(OA)_xOA$ in which each A represents an ethylene group, x is 0 or 1 and n is 2.

15. The composition of claim 11 wherein R is $A(OA)_xOA$ in which each A represents an ethylene group, x is 0 or 1 and n is 2.

16. The composition of claim 10 wherein R is a $C_4$–$C_6$ alkylene and n is 2.

* * * * *